(12) United States Patent
Lehmann et al.

(10) Patent No.: US 11,693,851 B2
(45) Date of Patent: Jul. 4, 2023

(54) PERMUTATION-BASED CLUSTERING OF COMPUTER-GENERATED DATA ENTRIES

(71) Applicant: ServiceNow, Inc., Santa Clara, CA (US)

(72) Inventors: Yaron Lehmann, Tel Aviv (IL); Dror Mann, New York, NY (US); Gabby Menahem, Santa Clara, CA (US)

(73) Assignee: ServiceNow, Inc., Santa Clara, CA (US)

( * ) Notice: Subject to any disclaimer, the term of this patent is extended or adjusted under 35 U.S.C. 154(b) by 247 days.

(21) Appl. No.: 17/122,369

(22) Filed: Dec. 15, 2020

(65) Prior Publication Data

US 2022/0188301 A1 Jun. 16, 2022

(51) Int. Cl.
*G06F 16/00* (2019.01)
*G06F 16/242* (2019.01)
*G06F 40/284* (2020.01)
*G06F 16/28* (2019.01)

(52) U.S. Cl.
CPC .......... *G06F 16/244* (2019.01); *G06F 16/285* (2019.01); *G06F 40/284* (2020.01)

(58) Field of Classification Search
CPC ........ G06F 16/322; G06F 40/44; G06F 40/30; G06F 40/237; G06F 40/284; G06F 16/3344; G06F 40/56; G06F 40/216; G06N 3/08
See application file for complete search history.

(56) References Cited

U.S. PATENT DOCUMENTS 10,990,767 B1 * 4/2021 Smathers .............. G06F 16/322

* cited by examiner

*Primary Examiner* — Yicun Wu
(74) *Attorney, Agent, or Firm* — Van Pelt, Yi & James LLP

(57) ABSTRACT

A computer-generated data entry is received. The computer-generated data entry is segmented into a set of tokens. A plurality of different token permutation groupings are determined. Each of the different token permutation groupings includes a different subset of tokens from the set of tokens of the computer-generated data entry. For the computer-generated data entry, a corresponding token permutation grouping identifier is determined for each grouping of the plurality of different token permutation groupings. It is determined whether the computer-generated data entry belongs to any data entry cluster among a plurality of previously identified data entry clusters based on a search performed using the token permutation grouping identifiers of the computer-generated data entry.

20 Claims, 7 Drawing Sheets

600 ⟶

L1: user alice.w failed to login into pc1.acme.com

L2: user bob.t failed to login into pc3.acme.com

L3: user charles.b failed to login into pc2.acme.com

L4: password reset request submitted by bob.t

L5: bob.t failed 3 login attempts into pc3.acme.com

P1: {user, to, into}

P2: {alice.w, failed, pc1.acme.com}

P3: {alice.w, login, into}

P1: {user, to, into}

P2: {bob.t, failed, pc3.acme.com}

P3: {bob.t, login, into}

PERMUTATION-BASED CLUSTERING OF COMPUTER-GENERATED DATA ENTRIES

BACKGROUND OF THE INVENTION

The amount of data being generated by various computers (e.g., appliances, servers, software tools, computers, etc.) connected in an organization is enormous. The computer-generated data may be in a structured textual format, an unstructured textual format, or a combination thereof. Examples for such computer-generated data include logs, metrics, configuration files, messages, spreadsheets, events, alerts, sensory signals, audit records, and so on. The various computers in an enterprises are typically from multiple different vendors, thus even if the data from each vendor is in a structured format, that data-structure is not unified across different vendors. Computer-generated data can be used to track business flow, provide usage analytics and performance data.

Computer-generated data can be also used to troubleshoot issues. For example, computer-generated data can be analyzed to determine a root cause of an information technology (IT) issue. Often this is a manual process, which involves scanning the computer-generated data and repeatedly trying different drill-downs to get to the specific computer-generated data that reveals the root cause of the issue. This existing manual approach for analyzing computer-generated data is inefficient.

BRIEF DESCRIPTION OF THE DRAWINGS

Various embodiments of the invention are disclosed in the following detailed description and the accompanying drawings.

FIGS. 6A-6E are diagrams illustrating examples of tokenizing and determining permutations for clustering computer-generated data entries.

DETAILED DESCRIPTION

Figure 1:
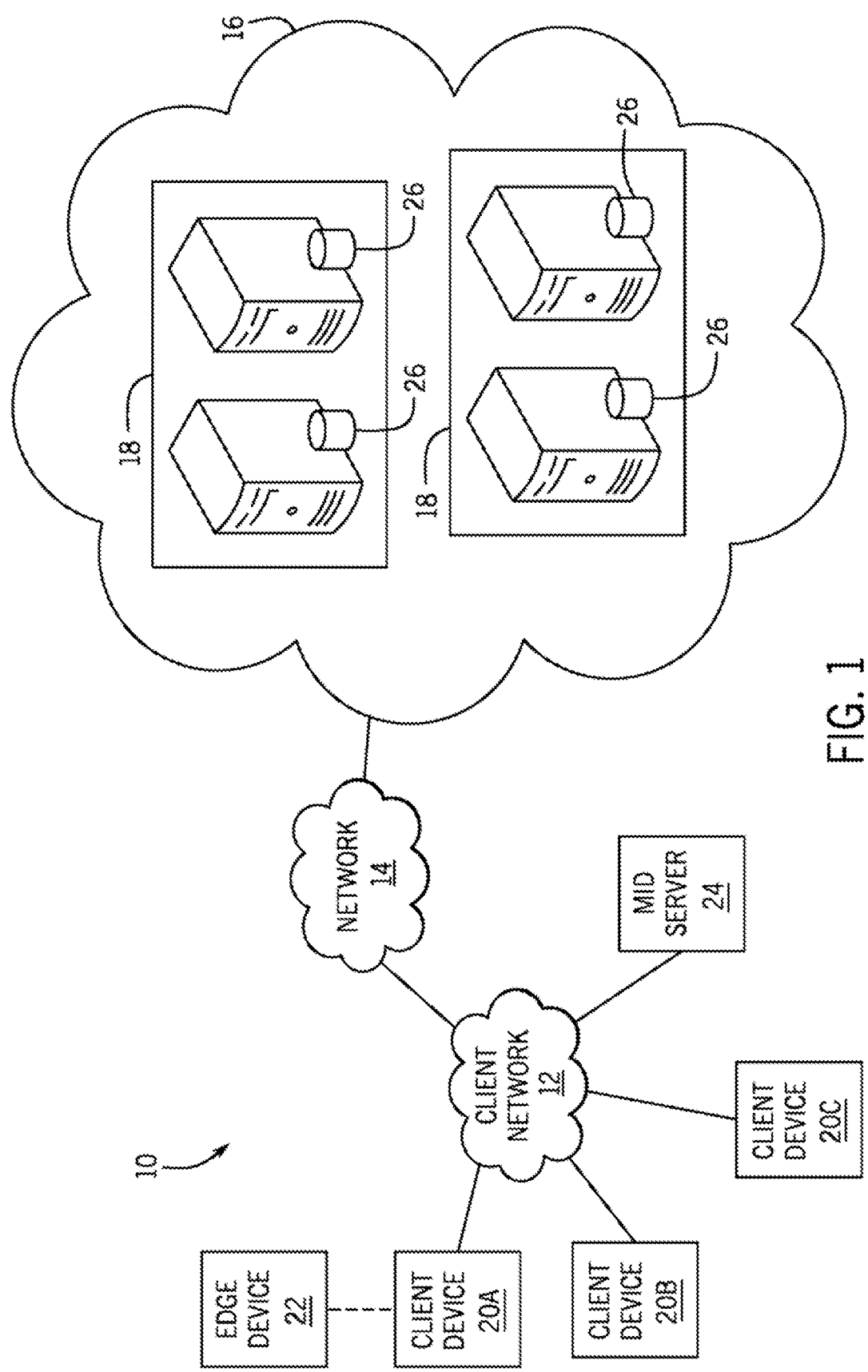
FIG. 1 is a schematic diagram of an embodiment of a computing environment.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

In some embodiments, computer-generated data entries are processed (offline or on-the-fly) to form clusters. For example, log entries that have been generated from the same log pattern are assigned to the same cluster. By clustering these similar log entries together, analysis of these entries can be made more accurate, efficient and simpler. For example, trends/patterns and anomalies within the entries of the same cluster can be more easily detected and/or an analysis determination can be made for the entire cluster as a whole. In another example, the assigned cluster is used for filtration—e.g., when a user is interested in only fetching or excluding entries of some cluster, instead of writing a query that matches the content of the entry, they can use the cluster identifier, thus simplifying and accelerating their work and reducing the required expertise.

In some embodiments, a computer-generated data entry is received. For example, a log entry is received for analysis. The computer-generated data entry is segmented into a set of tokens. For example, words included in a log entry are separated into tokens. A plurality of different token permutation groupings are determined. Each of the different token permutation groupings includes a different subset of tokens from the set of tokens of the computer-generated log entry. For example, a certain number of groups that each contain a certain number of the tokens are determined. For the computer-generated data entry, a unique token permutation grouping identifier is determined for each grouping of the plurality of different token permutation groupings. For example, a hash value is determined for each grouping of the plurality of different token permutation groupings. It is determined whether the computer-generated data entry belongs to a data entry cluster based on a search performed using the unique token permutation grouping identifiers of the computer-generated data entry. For example, already identified clusters each have associated token permutation grouping identifiers, and it is determined that a computer-generated log entry belongs to a specific log entry cluster if any of the unique token permutation grouping identifiers of the computer-generated log entry match any of the associated token permutation grouping identifiers of a specific log entry cluster.

With the preceding in mind, the following figures relate to various types of generalized system architectures or configurations that may be employed to provide services to an organization on which the present approaches may be employed. Correspondingly, these system and platform examples may also relate to systems and platforms on which the techniques discussed herein may be implemented or otherwise utilized. Turning now to FIG. 1, a schematic diagram of an embodiment of a computing system 10, such as a cloud computing system, in which embodiments of the present disclosure may operate, is illustrated. The computing system 10 may include a client network 12, a network 14 (e.g., the Internet), and a cloud-based platform 16. In some implementations, the cloud-based platform 16 may be a configuration management database (CMDB) platform. In one embodiment, the client network 12 may be a local private network, such as a local area network (LAN) that includes a variety of network devices that include, but are not limited to, switches, servers, and routers. In another embodiment, the client network 12 represents an enterprise network that could include one or more LANs, virtual networks, data centers 18, and/or other remote networks. As shown in FIG. 1, the client network 12 is able to connect to one or more client devices 20A, 20B, and 20C so that the client devices are able to communicate with each other and/or with the network hosting the platform 16. The client devices 20A-C may be computing systems and/or other types of computing devices generally referred to as Internet of Things (IoT) devices that access cloud computing services, for example, via a web browser application or via an edge device 22 that may act as a gateway between the client devices 20A-C and the platform 16. FIG. 1 also illustrates that the client network 12 includes a management, instrumentation, and discovery (MID) server 24 (optional or not existing in various embodiments) that facilitates communication of data between the network hosting the platform 16, other external applications, data sources, and services, and the client network 12. Although not specifically illustrated in FIG. 1, the client network 12 may also include a connecting network device (e.g., a gateway or router) or a combination of devices that implement a customer firewall or intrusion protection system.

For the illustrated embodiment, FIG. 1 illustrates that client network 12 is coupled to the network 14, which may include one or more computing networks, such as other LANs, wide area networks (WAN), the Internet, and/or other remote networks, in order to transfer data between the client devices 20A-C and the network hosting the platform 16. Each of the computing networks within network 14 may contain wired and/or wireless programmable devices that operate in the electrical and/or optical domain. For example, network 14 may include wireless networks, such as cellular networks (e.g., Global System for Mobile Communications (GSM) based cellular network), WIFI networks, and/or other suitable radio-based networks. The network 14 may also employ any number of network communication protocols, such as Transmission Control Protocol (TCP) and Internet Protocol (IP). Although not explicitly shown in FIG. 1, network 14 may include a variety of network devices, such as servers, routers, network switches, and/or other network hardware devices configured to transport data over the network 14.

In FIG. 1, the network hosting the platform 16 may be a remote network (e.g., a cloud network) that is able to communicate with the client devices 20A-C via the client network 12 and network 14. The network hosting the platform 16 provides additional computing resources to the client devices 20A-C and/or the client network 12. For example, by utilizing the network hosting the platform 16, users of the client devices 20A-C are able to build and execute applications for various enterprise, IT, and/or other organization-related functions. In one embodiment, the network hosting the platform 16 is implemented on the one or more data centers 18, where each data center could correspond to a different geographic location. Each of the data centers 18 includes a plurality of servers 26 (also referred to herein as application nodes, virtual servers, application servers, virtual server instances, application instances, or application server instances), where each server 26 can be implemented on a physical computing system, such as a single electronic computing device (e.g., a single physical hardware server) or across multiple-computing devices (e.g., multiple physical hardware servers). Examples of servers 26 include, but are not limited to, a virtual server, a web server (e.g., a unitary Apache installation), an application server (e.g., a unitary Java Virtual Computer), and/or a database server.

To utilize computing resources within the platform 16, network operators may choose to configure the data centers 18 using a variety of computing infrastructures. In one embodiment, one or more of the data centers 18 are configured using a multi-instance cloud architecture to provide every customer with its own unique customer instance or instances. For example, a multi-instance cloud architecture could provide each customer instance with its own dedicated application server and dedicated database server. In other examples, the multi-instance cloud architecture could deploy a single physical or virtual server 26 and/or other combinations of physical and/or virtual servers 26, such as one or more dedicated web servers, one or more dedicated application servers, and one or more database servers, for each customer instance. In a multi-instance cloud architecture, multiple customer instances could be installed on one or more respective hardware servers, where each customer instance is allocated certain portions of the physical server resources, such as computing memory, storage, and processing power. By doing so, each customer instance has its own unique software stack that provides the benefit of data isolation, relatively less downtime for customers to access the platform 16, and customer-driven upgrade schedules.

In some embodiments, the cloud-based platform 16 includes a computer-generated data management server that receives via network 14 and/or an internal network within or across different data centers, computer-generated data for storage and analysis. For example, log entries are sent from client devices/servers 20, MID server 24 (e.g., agent server acting as the intermediary in client network 12 to facilitate access to client network 12 by the network hosting the platform 16), and/or servers in data centers 18 to a log management server in data centers 18. In some embodiments, the computer-generated data management server is utilized to perform analysis of the received computer-generated data. Performing the analysis may include automatically identifying clusters of related computer-generated data entries (e.g., related log lines) to allow easier further analysis of data entries within the same cluster and/or further analysis of data entries together as a whole of the same cluster. Based on the analysis, automatic action may be taken. For example, an alert or a message identifying a detected anomaly is provided. In another example, access to a certain data, system, service, account, and/or network may be suspended based on the analysis.

Although FIG. 1 illustrates specific embodiments of a cloud computing system 10, the disclosure is not limited to the specific embodiments illustrated in FIG. 1. For instance, although FIG. 1 illustrates that the platform 16 is implemented using data centers, other embodiments of the platform 16 are not limited to data centers and can utilize other types of remote network infrastructures. Moreover, other embodiments of the present disclosure may combine one or more different virtual servers into a single virtual server. The use and discussion of FIG. 1 are only examples to facilitate ease of description and explanation and are not intended to limit the disclosure to the specific examples illustrated therein. As may be appreciated, the respective architectures and frameworks discussed with respect to FIG. 1 incorporate computing systems of various types (e.g., servers, workstations, client devices, laptops, tablet computers, cellular telephones, and so forth) throughout. For the sake of completeness, a brief, high level overview of components typically found in such systems is provided. As may be appreciated, the present overview is intended to merely provide a high-level, generalized view of components typical in such computing systems and should not be viewed as limiting in terms of components discussed or omitted from discussion.

Figure 2:
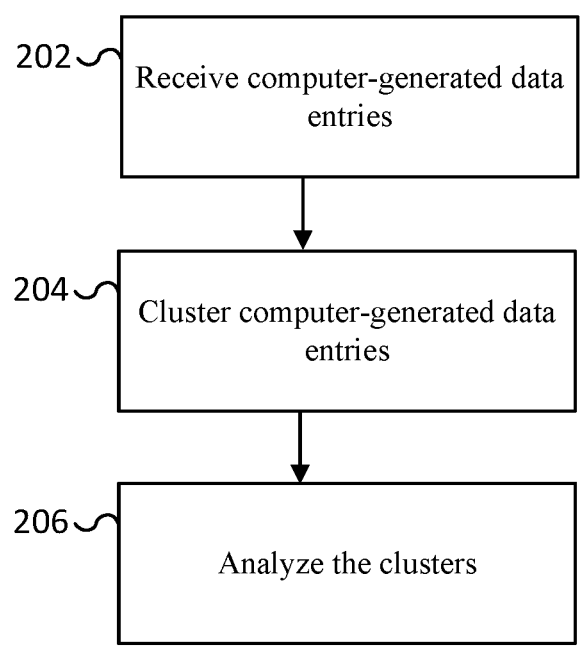
FIG. 2 is a flowchart illustrating an embodiment of a process for analyzing computer-generated data entries.

FIG. 2 is a flowchart illustrating an embodiment of a process for analyzing computer-generated data entries. The process of FIG. 2 may be implemented on a computer-generated data management/analysis server included as a server of data center 18 of FIG. 1.

At 202, computer-generated data entries are received. An example of the computer-generated data entries includes log entries/lines including recording of computer events. For example, alerts, status, outputs, transactions, messages, or other events of an application or other computer software or hardware component are outputted (e.g., continual stream) to a log as entries/lines in the log (e.g., file, database, memory, etc.). The computer-generated data entries may be generated by a customer device and sent for storage and/or analysis by a third-party service provider device (i.e., third-party different from sending party) and/or generated by a local device and sent to another networked device for storage and/or analysis. Examples for the computer-generated data sources include any IT-based device, such as routers, network appliances, application servers, database servers, sensors, and the like. The computer-generated data entries may be encapsulated in SYSLOG header, JSON or XML, serialization, plain text lines, and so on. Such entries can be pulled by the server, pushed to the server, uploaded to the server, received through other methods or channels, or a combination thereof. Log entries may be periodically and/or dynamically generated and locally cached (e.g., in a local file and/or database) for a period of time. New log entries that have not been sent can then be transferred to a destination in batches (e.g., each may contain new log entries not included in previously sent batches and/or may be capped in size up to a size limit). Each batch can be sent periodically (e.g., a new batch sent at periodic intervals) and/or dynamically (e.g., when the size of log entries not yet sent reaches a threshold size). In some embodiments, the destination receives the computer-generated data and stores/archives the computer-generated data and/or performs processing and/or analysis. For example, the destination serves as a log repository and/or a log analysis service provider.

At 204, computer-generated data entries are clustered (e.g., based on common origin). Clustering the computer-generated data entries includes grouping together similar ones of the computer-generated data entries together into groupings. Often a computer-generated data entry is generated based on a specified string pattern of text to be outputted. Many computer-generated data entries can be a result of the same specified output text pattern. Because the output computer-generated data entries of the same specified output text pattern likely arise from the same source (e.g., source code location), there are correlations and associations of these computer-generated data entries that are useful in analysis of the computer-generated data entries. For example, trends and anomalies within the entries can be identified among these the output computer-generated data entries of the same source. Unfortunately, computer-generated data entries very seldom identify their originating output text pattern or source. However, based on automatic analysis of contents of the computer-generated data entries, the computer-generated data entries can be categorized/divided into clusters (i.e., groupings) of similar content that may serve as a proxy for clusters based on the same originating output text pattern or source. A computer-generated data entry source output text pattern often includes fixed portions with consistent output text as well as variable portions that can change based on one or more dynamic variables. By identifying and matching the fixed portions of computer-generated data entries, clusters of data entries from the same corresponding computer-generated data entry source output text pattern can be identified.

An additional complicating factor is the need to perform clustering as fast and efficiently as possible. Because vast amounts of computer-generated data entries are continually being generated, it is important to perform clustering quickly to identify threats and errors indicated by computer-generated data entries quickly within given computing resource constraints. Thus a certain amount of clustering accuracy can be traded for speed and computing efficiency. Additionally, the clustering needs to adapt and learn on-the-fly due to frequent changes in the data and their patterns.

In some embodiments, clustering the computer-generated data entries includes segmenting each computer-generated data entry into tokens and creating different permutation groupings of a subset of the tokens with a hope that one of the permutation groupings only includes content corresponding to fixed portions of its source pattern. Computer-generated data entries sharing a common/same permutation grouping can be grouped together into the same cluster. An embodiment with further details on clustering is detailed later in the specification in conjunction with the process of FIG. 3.

At 206, the clusters are analyzed. In some embodiments, analyzing the clusters includes providing lists of the clusters of computer-generated data entries to a user/administrator for review or to assist in data analysis. In some embodiments, analyzing the clusters includes automatically identifying one or more trends and/or anomalies within the entries of each cluster and providing a message or notification based on the analysis. In some embodiments, analyzing the clusters includes making a single combined analysis determination (e.g., security determination, error determination, etc.) as a whole for each entire cluster rather than for individual data entries. In various embodiments, step 206 and the analysis of the clusters is optional.

Figure 3:
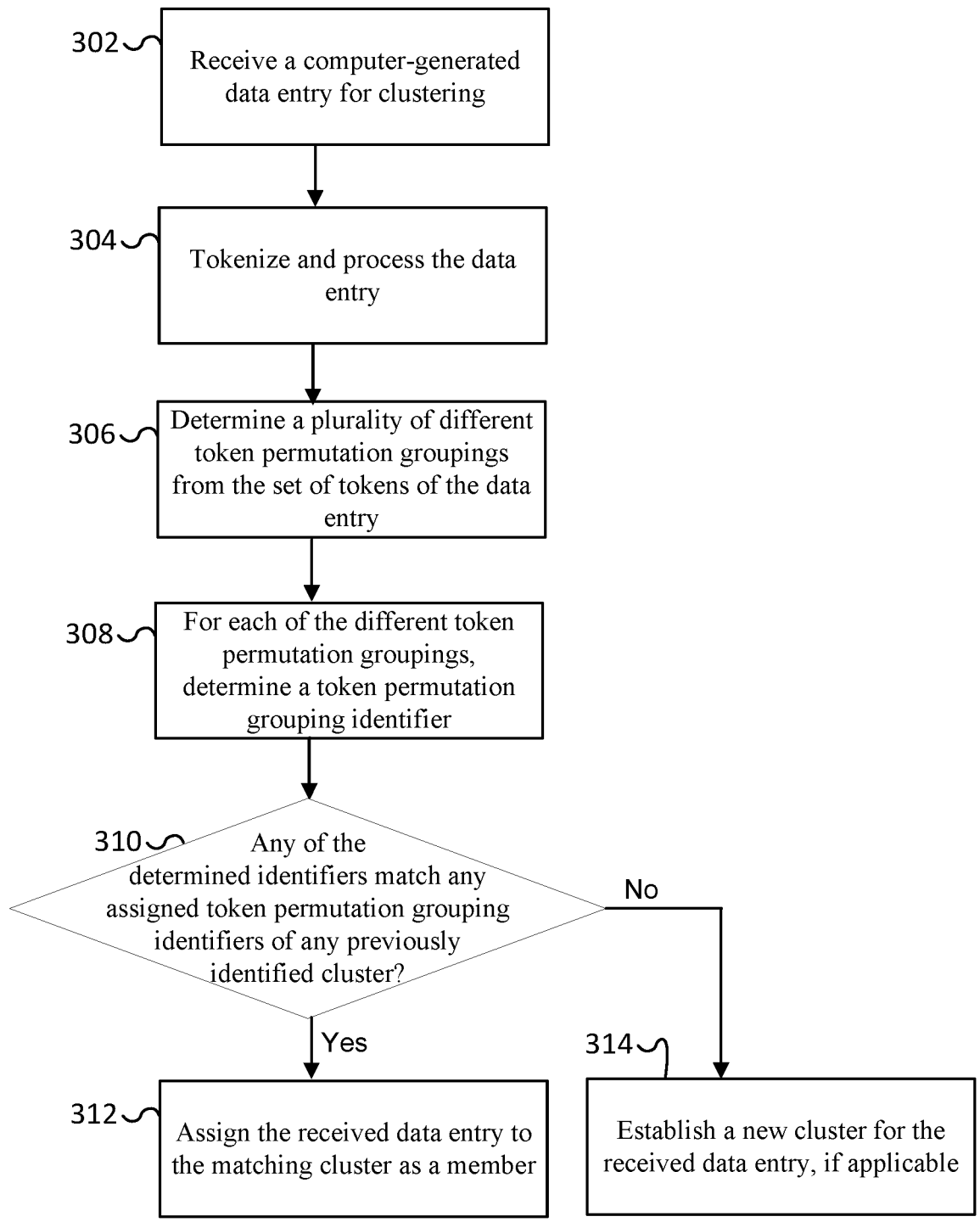
FIG. 3 is a flowchart illustrating an embodiment of a process for clustering computer-generated data entries.

FIG. 3 is a flowchart illustrating an embodiment of a process for clustering computer-generated data entries. The process of FIG. 3 may be implemented on a computer-generated data management/analysis server included as a server of data center 18 of FIG. 1. In some embodiments, at least a portion of the process of FIG. 3 is performed in 204 of the process of FIG. 2. The process of FIG. 3 may be performed again for each computer-generated data entry (e.g., computer-generated log entry/line) of a plurality of computer-generated data entries to be clustered.

At 302, a computer-generated data entry is received for clustering. In some embodiments, the computer-generated data entry is one entry among the computer-generated data entries in 202 of FIG. 2. In some embodiments, the computer-generated data entry is a computer-generated log entry.

For example, the computer-generated data entry includes text content that identifies an alert, status, output, transaction, message, or other event of an application or other computer software or hardware component.

At 304, the data entry is tokenized and processed (e.g., to determine a set of tokens). For example, words included in the data entry are separated into different tokens that each include a word of the data entry. The separation between one token to another token within the data entry is identified by one or more delimiter characters that are discarded and not included in any token. Examples of the delimiter characters include a space, punctuation characters, line breaks etc. Relative ordering of the tokens within the data entry is retained in the set of determined tokens. In some embodiments, as an optimization reducing the computational cost of the algorithm, if the number of tokens in the data entry is greater than a threshold number, tokens beyond the threshold number are dropped and not included in the set of determined tokens. For example, only the first threshold number of tokens identified in the data entry is included in the set of determined tokens. In some embodiments, certain selective content/words in the data entry are not included in the set of determined tokens.

At 306, a plurality of different token permutation groupings from the set of tokens of the data entry are determined. Each different token permutation grouping includes only a unique set of tokens (e.g., tokens can partially overlap but completely overlap across the different permutation groupings). The number of permutation groupings and the number of tokens included in each permutation grouping are based on the total number of tokens in the set of determined tokens determined in 304. For example, for each possible value for the total number of tokens in the set of determined tokens, these two values (i.e., the number of permutation groupings and the number of tokens included in each permutation grouping) are specified (e.g., for 20 tokens in the set of determined tokens, 10 permutation groupings of 4 tokens are to be determined). Selecting the tokens of a grouping of the different token permutation groupings may include at least in part randomly selecting a specified number of tokens from the set of determined tokens such that each different token permutation grouping includes a different combination of tokens. The relative ordering of the tokens within the set of tokens is maintained in the ordering of tokens in each different token permutation grouping. For example, the order of tokens within each different token permutation grouping matches the relative order these tokens appear in the corresponding originally received computer-generated data entry.

In some embodiments, as an optimization to improve the algorithm accuracy, certain tokens with certain specified content are to be included or have a biased higher chance of being included in the token permutation groupings. For example, certain words (e.g., prepositional words, article words, etc.) associated with fixed content of output text patterns are to be (e.g., 100% chance) or are made more likely to be (e.g., higher probability weight during random selection) included in the different token permutation groupings. In some embodiments, certain tokens with certain specified content are to be not included or have a biased lower chance of being included in the token permutation groupings. For example, certain words (e.g., good, bad, yes, no high, low, on, off, connected, disconnected, etc.) associated with variable content of output text patterns are not to be (e.g., 0% chance) or are made less likely to be (e.g., lower probability weight during random selection) included in the different token permutation groupings.

At 308, for each of the different token permutation groupings, a token permutation grouping identifier is determined. The token permutation grouping identifier uniquely identifies the content of the corresponding token permutation groupings. For example, a corresponding hash value is determined for content of each of the different token permutation groupings. The token permutation grouping identifier is dependent upon relative ordering of the tokens within the corresponding token permutation grouping (e.g., locality/ordering sensitive). For example, the tokens of a permutation grouping are concatenated in an order of the permutation grouping before a locality/ordering sensitive hash function is applied to determine the hash value of the unique token permutation grouping identifier.

At 310, it is determined whether any of the token permutation grouping identifiers for the received data entry match any assigned token permutation grouping identifiers of any previously identified cluster. For example, computer-generated data entries with same associated token permutation grouping identifiers are to be clustered into the same entry cluster. Each different cluster has one or more assigned token permutation grouping identifiers that identify token permutation grouping identifiers shared by all of its one or more member computer-generated data entries. For example, when two computer-generated data entries are assigned to the same cluster, the common ones of the two different sets of token permutation grouping identifiers determined separately for the two different computer-generated data entries become the assigned token permutation grouping identifier(s) of the cluster. In some embodiments, the first identified cluster with an assigned token permutation grouping identifier that matches one of the token permutation grouping identifiers for the received data entry is identified as the matching cluster. In some embodiments, if the token permutation grouping identifiers for the received data entry matches multiple previously identified clusters, the cluster with the most number of matching token permutation grouping identifiers is identified as the matching cluster. If multiple clusters have the same number of matching token permutation grouping identifiers, the process may return to 306 to determine an alternative plurality of different token permutation groupings based on a changed parameter (e.g., increase the number of permutations or the size of each permutation) and the clusters may also be determined again using the changed parameter. In some embodiments, if a single matching cluster is still unable to be identified, the different matching clusters are combined into a single cluster that can be matched.

In some embodiments, if the token permutation grouping identifiers for the received data entry matches multiple previously identified clusters, the cluster associated with a higher match score is identified as the matching cluster. For example, a training dataset of sample data entries is obtained (e.g., either before the algorithm begins forming the clustering, or periodically as part of a "rebuild" process). These data entries are processed to obtain hints for permutation optimizations: words that are likely to be "fixed parts" (e.g., nouns, verbs, prepositions, etc.), and words that are likely to be "changing parts" (e.g., IP-addresses, domain names, file-paths, numbers, etc.). Then a probability function determined (e.g., for a data-entry with T tokens, what is the probability to have a CP (changing-part) at each position, and what is the probability to have a FP (fixed-part) at each position, given by:

$$P_C(T,i)=P(CP|T,i)\text{—probability of }CP\text{ given number of tokens }T\text{ and position }i$$

$P_F(T,i)=P(FP|T,i)$—probability of FP given number of tokens T and position i

Then, for each T and i, a score is determined. An example of a scoring function is:

$S_{Ti}=\alpha \times P_F(T,i)-(1-\alpha)\times P_C(T,i)$, where α is a fixed number between 0 and 1.

Finally for every T, the match score is the sum of the scores of its positions. Permutations with higher score is likely to yield better results. This algorithm can be biased if some clusters are more frequent in the training dataset than others. The optimal dataset includes an equal number of entries of every cluster. However, since it is only possible to build such a dataset if the clustering is already available, this optimization can iterated periodically as clusters form, possibly improving the optimization result every time.

If at 310, it is determined that at least one of the token permutation grouping identifiers for the received data entry matches an assigned token permutation grouping identifier of a previously identified cluster, at 312, the received data entry is assigned to the matching cluster as a member. In some embodiments, the assigned token permutation grouping identifiers of this matching cluster are updated to only include token permutation grouping identifiers in common with the token permutation grouping identifiers for the received data entry. For example, the assigned token permutation grouping identifiers of this matching cluster are updated to remove any token permutation grouping identifiers that included in the token permutation grouping identifiers for the received data entry.

If at 310, it is determined that none of the token permutation grouping identifiers for the received data entry matches any assigned token permutation grouping identifiers of any previously identified cluster, at 314, a new cluster is established for the received data entry, if applicable. For example, the new cluster with the received data entry as its only member is established. The assigned token permutation grouping identifiers of this new cluster are the token permutation grouping identifiers for the received data entry. In some embodiments, further searching is performed to identify matches against other data entries of different token count lengths. For example, the matching in 310 is optimized for matching and clustering data entries of the same token count lengths and further searching is performed of clustering across data entries of different token count lengths, as further discussed in conjunction with the process of FIG. 4.

Figure 4:
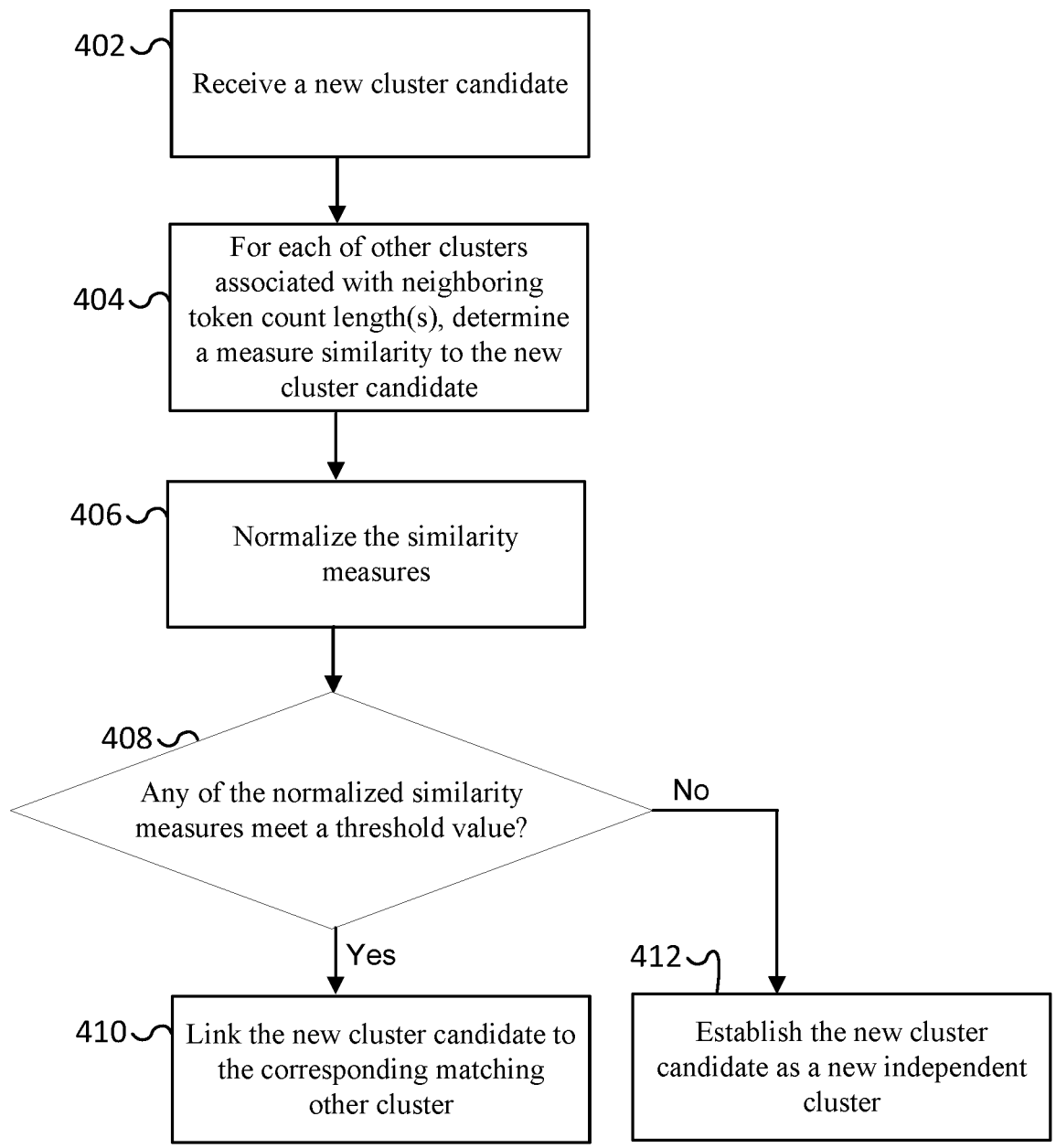
FIG. 4 is a flowchart illustrating an embodiment of a process for clustering computer-generated data entries of different token count lengths.

FIG. 4 is a flowchart illustrating an embodiment of a process for clustering computer-generated data entries of different token count lengths. The process of FIG. 4 may be implemented on a computer-generated data management/analysis server included as a server of data center 18 of FIG. 1. In some embodiments, at least a portion of the process of FIG. 4 is performed in 314 of the process of FIG. 3.

At 402, a new cluster candidate is received. In some embodiments, the new cluster candidate is the new cluster in 314 of FIG. 3 with as its only member the received data entry not matching any cluster in 310.

At 404, for each of other clusters associated with neighboring token count length(s), a measure similarity to the new cluster candidate is determined. For example, for the new cluster candidate, a different similarity measure is determined for each of the other clusters associated with neighboring token count length(s). The token count length of the new cluster candidate is the number of tokens in the content of its member computer-generated data entry (e.g., number of tokens identified in 304 of FIG. 3). The other clusters associated with neighboring token count lengths are other clusters with a member entry that has a token count length (e.g., the number of tokens in the content) within a threshold range from the token count length of the new cluster candidate. For example, the other clusters associated with neighboring token count lengths are other clusters with a member token count length of plus or minus one of the token count length of the new cluster candidate. Determining the similarity measure may include determining an amount/degree of difference between content of a set of tokens included in the member computer-generated data entry of the new cluster candidate and content of a set of tokens included in a selected member computer-generated data entry of corresponding other clusters. Examples of the similarity measure include an edit distance, a Levenshtein distance, Hamming distance, etc.

At 406, the similarity measures are normalized. In some embodiments, the similarity measures are normalized with respect to the token count length (e.g., divided by token count length) of at least one of the corresponding clusters being compared (e.g., token count length of the corresponding other cluster). For example, to allow comparability of the similarity measures as a magnitude of change averaged for data size, the similarity measures are normalized with respect to the token count length. When thresholding, larger token count lengths are allowed larger changes given its larger data size while smaller token count lengths are allowed smaller changes given its smaller data size.

At 408, it is determined whether any of the normalized similarity measures meet a threshold value. For example, if a normalized similarity measure between the new cluster candidate and a specific other cluster is equal to or greater than the threshold value, it is determined that they are similar enough to be considered a part of the cluster.

If at 408, it is determined at least one of the normalized similarity measures meets the threshold value, at 410, the new cluster candidate is linked to the corresponding matching other cluster of the normalized similarity measure meeting the threshold value. In some embodiments, linking the new cluster candidate includes having its single member data entry become a member of the corresponding other cluster and not establishing a new cluster candidate as an independent new cluster. In some embodiments, if multiple normalized similarity measures meet the threshold value, the corresponding other cluster of the first normalized similarity measure identified as meeting the threshold value is the matching other cluster that the new cluster candidate is linked to. In some embodiments, if multiple normalized similarity measures meet the threshold value, the corresponding other cluster of the best matching normalized similarity measure (e.g., highest value) is the matching other cluster that the new cluster candidate is linked to.

If at 408, it is determined none of the normalized similarity measures meets the threshold value, at 412, the new cluster candidate is established as a new independent cluster. Other data entries can match and become a member of this new independent cluster via the process of FIG. 3.

Figure 5:
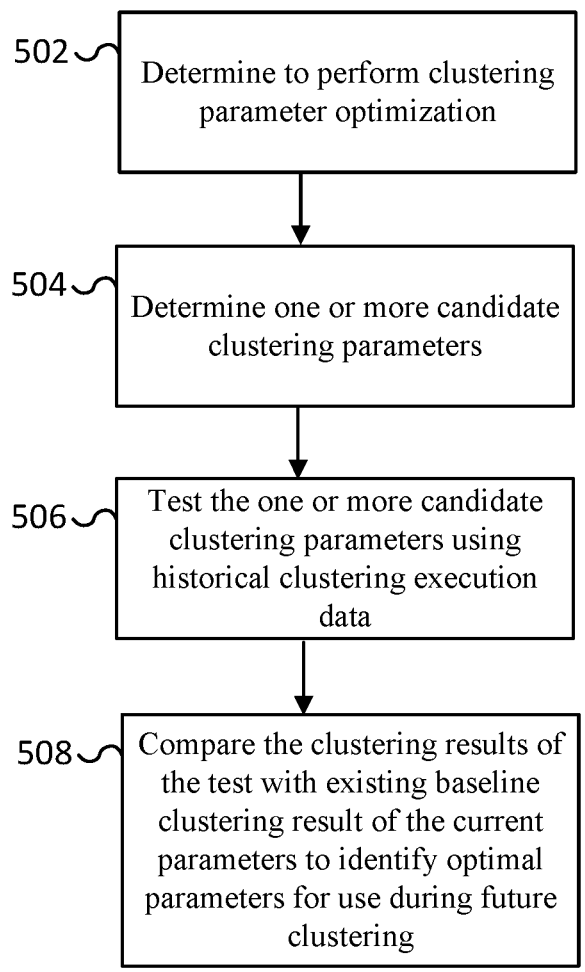
FIG. 5 is a flowchart illustrating an embodiment of a process for optimizing parameters for computer-generated data entry clustering.

FIG. 5 is a flowchart illustrating an embodiment of a process for optimizing parameters for computer-generated data entry clustering. The process of FIG. 5 may be implemented on a computer-generated data management/analysis server included as a server of data center 18 of FIG. 1.

At 502, it is determined to perform clustering parameter optimization. Although certain default parameters have been specified for use during computer-generated data entry clustering, adjustments to the parameters can be attempted to make execution of the clustering more compute efficient, if possible. In some embodiments, clustering parameter optimization utilizes information collected during previous clustering execution, and it is determined to perform clustering parameter optimization after the current parameters are utilized at least a threshold number of times and/or a threshold amount of time. For example, the utilized parameters, the sets of tokens of previously clustered computer-generated data entries, and identified clusters are recorded for use in performing clustering parameter optimization. Examples of the clustering parameters include the number of permutation groupings and the number of tokens included in each permutation grouping (e.g., parameters utilized in 306 of the process of FIG. 3 to determine permutation groupings). In some embodiments, it is determined to perform clustering parameter optimization periodically. In some embodiments, it is determined to perform clustering parameter optimization dynamically (e.g., upon detection of a reduction in an amount of available computing resources). In some embodiments, the optimization will be performed based on the number of clusters (e.g., there is a relation between number of clusters and the required permutations attributes to achieve the same accuracy).

At 504, one or more candidate clustering parameters are determined. The candidate clustering parameters may be one or more value decreases and/or increases from the value of the current clustering parameter. For example, different permutations of possible values to test for the clustering parameters are determined. For example, because lower numbers often equate less processing, the desire is to reduce the number of permutation groupings and the number of tokens included in each permutation grouping as much as possible without materially affecting the accuracy of clustering. Thus candidate clustering parameters with decreases in the number of permutation groupings and the number of tokens included in each permutation grouping are to be tested to see their effect on clustering accuracy. Increases in the number of permutation groupings and the number of tokens included in each permutation grouping may also be tested to detect potential inaccuracies in the existing clustering parameters. For example, much like compression, there a tradeoff between size and quality, and the optimization in effect attempts to find the parameters that give the best performance while still keeping the content recognizable.

At 506, the one or more candidate clustering parameters are tested using historical clustering execution data. For example, for the same computer-generated data entries already clustered using the existing parameters, the candidate clustering parameters are used (e.g., using the process of FIG. 3) and are clustered again for the different combinations of candidate clustering parameters. The resulting clusters from using the candidate clustering parameters can be used to gage the clustering accuracy of these parameters.

At 508, clustering results of the test are compared with existing baseline clustering results of the current parameters (e.g., collected data from previous clustering execution) to identify optimal parameters for use during future clustering. For example, the optimal parameters are the smallest pair of values of the candidate clustering parameters for the number of permutation groupings and the number of tokens included in each permutation grouping that result in the same or similar clustering results as the baseline clustering results of the existing parameters (e.g., an amount of change from the baseline clustering result is within a change limit). If the optimal parameters are not the current parameters, the current parameters are adjusted to these optimal parameters for use during the next clustering execution. If ones of the test clustering results of the candidate clustering parameters associated with lower processing requirements all indicate a change from the baseline clustering result beyond a change limit, it is determined that those candidate clustering parameters are not accurate enough for use and the current parameters are not adjusted.

In some embodiments, if one or more candidate clustering parameters are associated with higher processing requirements and the test clustering results for these candidate clustering parameters indicate an amount of change from the baseline clustering results beyond a change limit, it is determined that the current parameters may not be accurate enough and an indication may be provided to allow an administration to review whether clustering parameters should be adjusted to increase processing load to improve accuracy. Instead of or in addition to sending the indication, these candidate clustering parameters are associated with the higher processing requirements (e.g., higher number of permutation groupings and/or higher number of tokens in a permutation grouping) and may be automatically selected as the optimal parameters and the clustering parameters may be automatically adjusted to be these optimal parameters.

FIGS. 6A-6E are diagrams illustrating examples of tokenizing and determining permutations for clustering computer-generated data entries. The examples discussed along with FIGS. 6A-6E illustrate examples of various steps of the processes of FIGS. 2-5. Lines 600 of FIG. 6A show example received computer-generated data entries (e.g., lines of a computer-generated log). When the first line of 600 is received for clustering, it is tokenized to generate a set of tokens: {user, alice.w, failed, to, login, into, pc1.acme.com} (e.g., see 304 of FIG. 3). FIG. 6B shows a plurality of different token permutation groupings (602) from the set of tokens for L1 of 600 (e.g., number and size of permutations dependent on number of tokens) (e.g., see 306 of FIG. 3). Then a token permutation grouping identifier (e.g., a hash) of each of the different token permutation groupings for L1 are determined (e.g., concatenate the tokens and calculate hash value) as shown in 604 of FIG. 6C (e.g., see 308 of FIG. 3). Since no clusters have been determined yet, a new corresponding cluster is created with a set of hash/identifier values: {1707735249, 2369213686, 941321306} (e.g., see 314 of FIG. 3). When the next line of 600 (L2) is received for clustering, it is tokenized into a set of tokens: {user, bob.t, failed, to, login, into, pc3.acme.com} (e.g., see 304 of FIG. 3). FIG. 6D shows a plurality of different token permutation groupings (606) from the set of tokens for L2 of 600 (e.g., number and size of permutations dependent on number of tokens) (e.g., see 306 of FIG. 3). Then a token permutation grouping identifier (e.g., a hash) of each of the different token permutation groupings for L2 is determined (e.g., concatenate the tokens and calculate hash value) as shown in 608 of FIG. 6E (e.g., see 308 of FIG. 3). Since identifier for P1 shown in 608 is present in the previously determined hashes/identifiers of the cluster for L1, L2 of 600 is a match with this cluster (e.g., see 310 of FIG. 3). L2 is added to this cluster, and because the only common hash/identifier between the set of hash/identifier values of the cluster and the hashes in 608 for L2 is for P1 of 608, the set of hash/identifier values of the cluster is updated to be {1707735249} to remove the other hashes/identifiers corresponding to P2 and P3 in 604 (e.g., see 312 of FIG. 3). A similar process repeats until L1, L2, and L3 of 600 are clustered into the same cluster and L4 and L5 are placed into different clusters.

Figure 7:
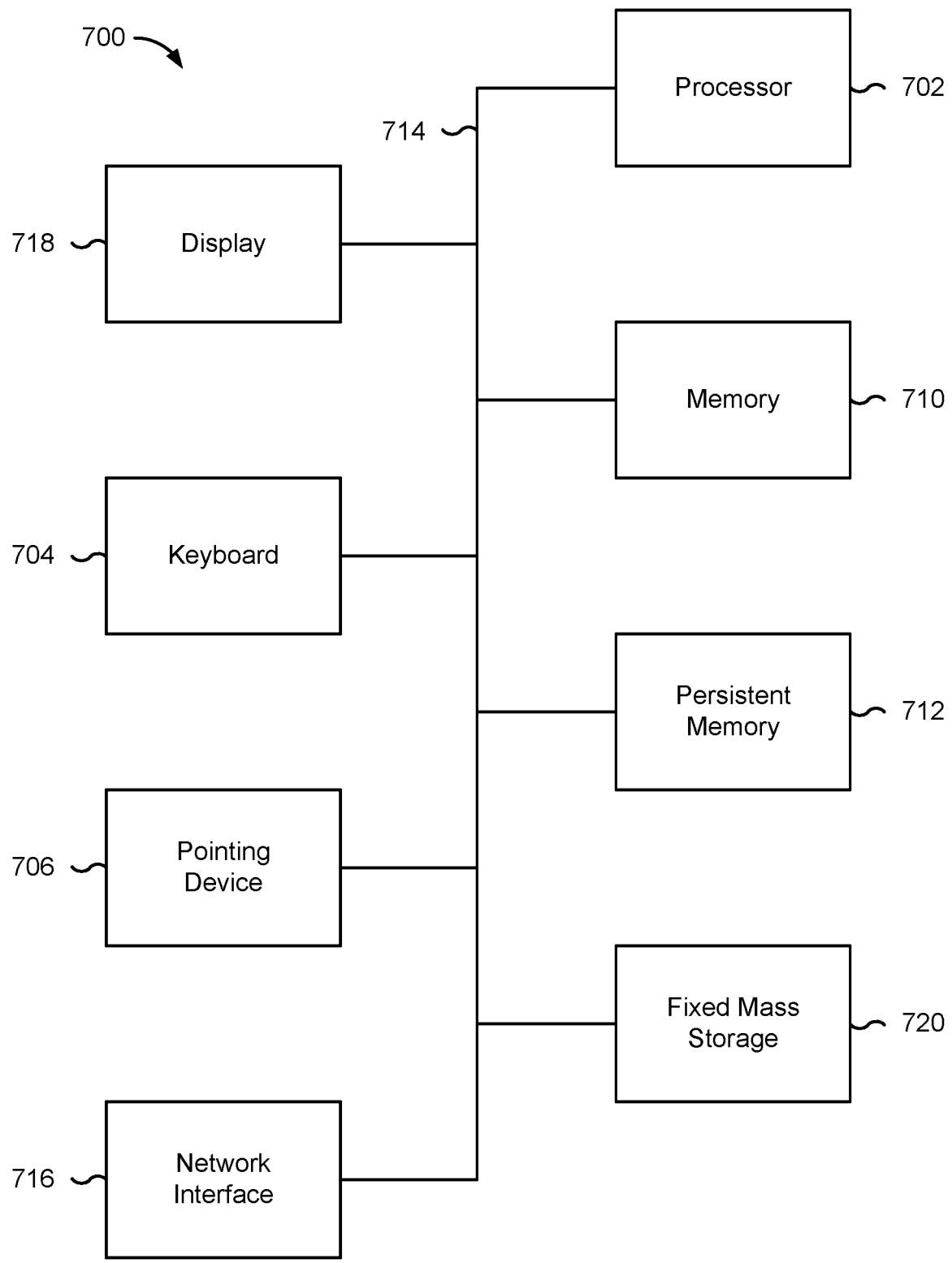
FIG. 7 is a functional diagram illustrating a programmed computer system.

FIG. 7 is a functional diagram illustrating a programmed computer system. In some embodiments, the programmed computer system is any device or server shown in FIG. 1.

In the example shown, computer system 700 includes various subsystems as described below. Computer system 700 includes at least one microprocessor subsystem (also referred to as a processor or a central processing unit (CPU)) 702. For example, processor 702 can be implemented by a single-chip processor or by multiple processors. In some embodiments, processor 702 is a general-purpose digital processor that controls the operation of computer system 700. Using instructions retrieved from memory 710, processor 702 controls the reception and manipulation of input data, and the output and display of data on output devices (e.g., display 718).

Processor 702 is coupled bi-directionally with memory 710, which can include a first primary storage, typically a random-access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 702. Also, as is well known in the art, primary storage typically includes basic operating instructions, program code, data, and objects used by processor 702 to perform its functions (e.g., programmed instructions). For example, memory 710 can include any suitable computer-readable storage media, described below, depending on whether, for example, data access needs to be bi-directional or uni-directional. For example, processor 702 can also directly and very rapidly retrieve and store frequently needed data in a cache memory (not shown).

Persistent memory 712 (e.g., a removable mass storage device) provides additional data storage capacity for computer system 700, and is coupled either bi-directionally (read/write) or uni-directionally (read only) to processor 702. For example, persistent memory 712 can also include computer-readable media such as magnetic tape, flash memory, PC-CARDS, portable mass storage devices, holographic storage devices, and other storage devices. A fixed mass storage 720 can also, for example, provide additional data storage capacity. The most common example of fixed mass storage 720 is a hard disk drive. Persistent memory 712 and fixed mass storage 720 generally store additional programming instructions, data, and the like that typically are not in active use by processor 702. It will be appreciated that the information retained within persistent memory 712 and fixed mass storages 720 can be incorporated, if needed, in standard fashion as part of memory 710 (e.g., RAM) as virtual memory.

In addition to providing processor 702 access to storage subsystems, bus 714 can also be used to provide access to other subsystems and devices. As shown, these can include a display monitor 718, a network interface 716, a keyboard 704, and a pointing device 706, as well as an auxiliary input/output device interface, a sound card, speakers, and other subsystems as needed. For example, pointing device 706 can be a mouse, stylus, track ball, or tablet, and is useful for interacting with a graphical user interface.

Network interface 716 allows processor 702 to be coupled to another computer, computer network, or telecommunications network using a network connection as shown. For example, through network interface 716, processor 702 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 702 can be used to connect computer system 700 to an external network and transfer data according to standard protocols. Processes can be executed on processor 702, or can be performed across a network such as the Internet, intranet networks, or local area networks, in conjunction with a remote processor that shares a portion of the processing. Additional mass storage devices (not shown) can also be connected to processor 702 through network interface 716.

An auxiliary I/O device interface (not shown) can be used in conjunction with computer system 700. The auxiliary I/O device interface can include general and customized interfaces that allow processor 702 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above: magnetic media such as hard disks, floppy disks, and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code, as produced, for example, by a compiler, or files containing higher level code (e.g., script) that can be executed using an interpreter.

The computer system shown in FIG. 7 is but an example of a computer system suitable for use with the various embodiments disclosed herein. Other computer systems suitable for such use can include additional or fewer subsystems. In addition, bus 714 is illustrative of any interconnection scheme serving to link the subsystems. Other computer architectures having different configurations of subsystems can also be utilized.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   receiving a computer-generated data entry;
   segmenting the computer-generated data entry into a set of tokens;
   determining a plurality of different token permutation groupings, wherein each of the different token permutation groupings includes a different subset of tokens from the set of tokens of the computer-generated data entry;

obtaining, for the computer-generated data entry, a plurality of token permutation grouping identifiers respectively associated with the plurality of different token permutation groupings;

searching each set among a plurality of sets of token permutation grouping identifiers, the each set belonging to a different cluster among a plurality of previously identified data entry clusters, for a token permutation grouping identifier match to one or more of the obtained plurality of token permutation grouping identifiers of the computer-generated data entry; and determining whether the computer-generated data entry belongs to any data entry cluster among the plurality of previously identified data entry clusters based on a result of the search for the token permutation grouping identifier match.

2. The method of claim 1, wherein at least one of the data entry clusters includes data entries determined to be likely associated with a common source code text pattern specification.

3. The method of claim 1, further comprising adding the computer-generated data entry to a matching one of the data entry clusters based on a determination that the computer-generated data entry belongs to the matching data entry cluster.

4. The method of claim 3, further comprising updating assigned token permutation grouping identifiers of the matching data entry cluster to only include ones in common with the token permutation grouping identifiers generated for the computer-generated data entry added to the matching data entry cluster.

5. The method of claim 3, further comprising performing an analysis based on the matching data entry cluster including by identifying a trend or an anomaly of data entries belonging to the matching data entry cluster.

6. The method of claim 1, further comprising creating a new data entry cluster that includes the computer-generated data entry based on a determination that the computer-generated data entry does not belong to any of the data entry clusters.

7. The method of claim 1, wherein the computer-generated data entry is a computer-generated log entry or a computer-generated log line.

8. The method of claim 1, wherein segmenting the computer-generated data entry includes separating words included in the computer-generated data entry into the set of tokens.

9. The method of claim 1, wherein segmenting the computer-generated data entry includes determining not to include in the set of tokens a word included in the computer-generated data entry.

10. The method of claim 1, wherein a count number of the plurality of different token permutation groupings generated is based on a total number of tokens included in the set of tokens.

11. The method of claim 1, wherein a count number of tokens included in each of the plurality of different token permutation groupings is based on a total number of tokens included in the set of tokens.

12. The method of claim 1, wherein determining the plurality of different token permutation groupings includes at least in part randomly selecting a specified number of tokens from the set of tokens such that each of the plurality of different token permutation groupings includes a different combination of tokens.

13. The method of claim 1, wherein determining the plurality of different token permutation groupings includes determining to not include a specific token from the set of tokens in any of the plurality of different token permutation groupings due to content of the specific token.

14. The method of claim 1, wherein determining the plurality of different token permutation groupings includes determining to include a specific token from the set of tokens in every one of the plurality of different token permutation groupings due to content of the specific token.

15. The method of claim 1, wherein obtaining the plurality of token permutation grouping identifiers includes determining for each of the plurality of token permutation grouping identifiers of the computer-generated data entry, a corresponding hash value that is dependent upon a relative ordering of tokens included in the corresponding associated token permutation grouping.

16. The method of claim 1, wherein performing the search includes determining similarity measures between the obtained plurality of token permutation grouping identifiers of the computer-generated data entry and identifiers in the plurality of sets of token permutation grouping identifiers.

17. The method of claim 16, wherein determining the similarity measures includes comparing token count lengths.

18. The method of claim 1, further comprising adjusting a clustering parameter based at least in part on a repeat clustering performed on the same received computer-generated data entry using a clustering parameter candidate.

19. A system, comprising:
one or more processors configured to:
receive a computer-generated data entry;
segment the computer-generated data entry into a set of tokens;
determine a plurality of different token permutation groupings, wherein each of the different token permutation groupings includes a different subset of tokens from the set of tokens of the computer-generated data entry;
obtain, for the computer-generated data entry, a plurality of token permutation grouping identifiers respectively associated with the plurality of different token permutation groupings;
search each set among a plurality of sets of token permutation grouping identifiers, the each set belonging to a different cluster among a plurality of previously identified data entry clusters, for a token permutation grouping identifier match to one or more of the obtained plurality of token permutation grouping identifiers of the computer-generated data entry; and
determine whether the computer-generated data entry belongs to any data entry cluster among the plurality of previously identified data entry clusters based on a result of the search for the token permutation grouping identifier match; and
a memory coupled to at least one of the one or more processors and configured to provide the at least one of the one or more processors with instructions.

20. A computer program product, the computer program product being embodied in a non-transitory computer readable storage medium and comprising computer instructions for:
receiving a computer-generated data entry;
segmenting the computer-generated data entry into a set of tokens;
determining a plurality of different token permutation groupings, wherein each of the different token permutation groupings includes a different subset of tokens from the set of tokens of the computer-generated data entry;

obtaining, for the computer-generated data entry, a plurality of token permutation grouping identifiers respectively associated with the plurality of different token permutation groupings;

searching each set among a plurality of sets of token permutation grouping identifiers, the each set belonging to a different cluster among a plurality of previously identified data entry clusters, for a token permutation grouping identifier match to one or more of the obtained plurality of token permutation grouping identifiers of the computer-generated data entry; and determining whether the computer-generated data entry belongs to any data entry cluster among the plurality of previously identified data entry clusters based on a result of the search for the token permutation grouping identifier match.

\* \* \* \* \*